Patented Aug. 11, 1925.

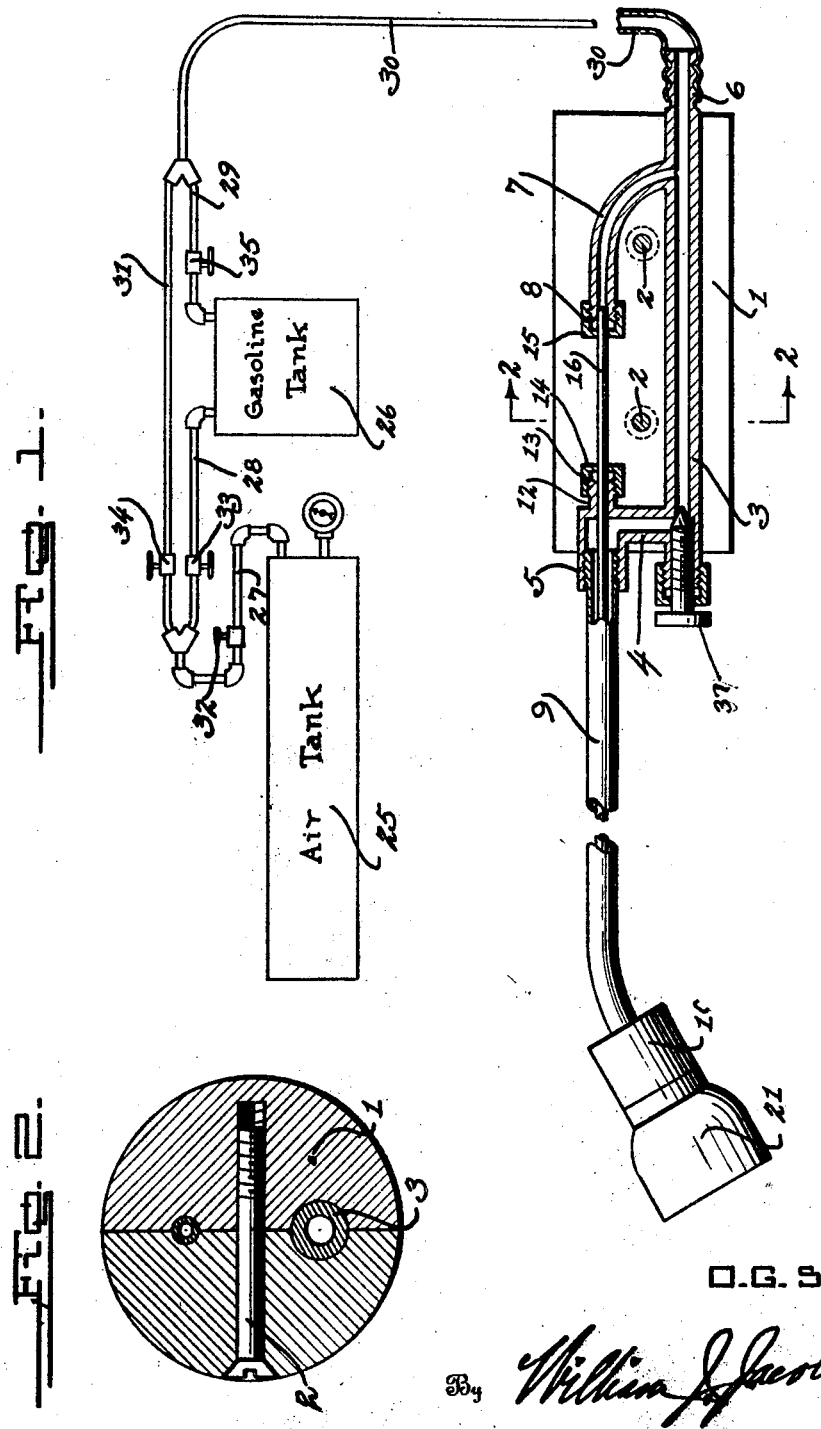

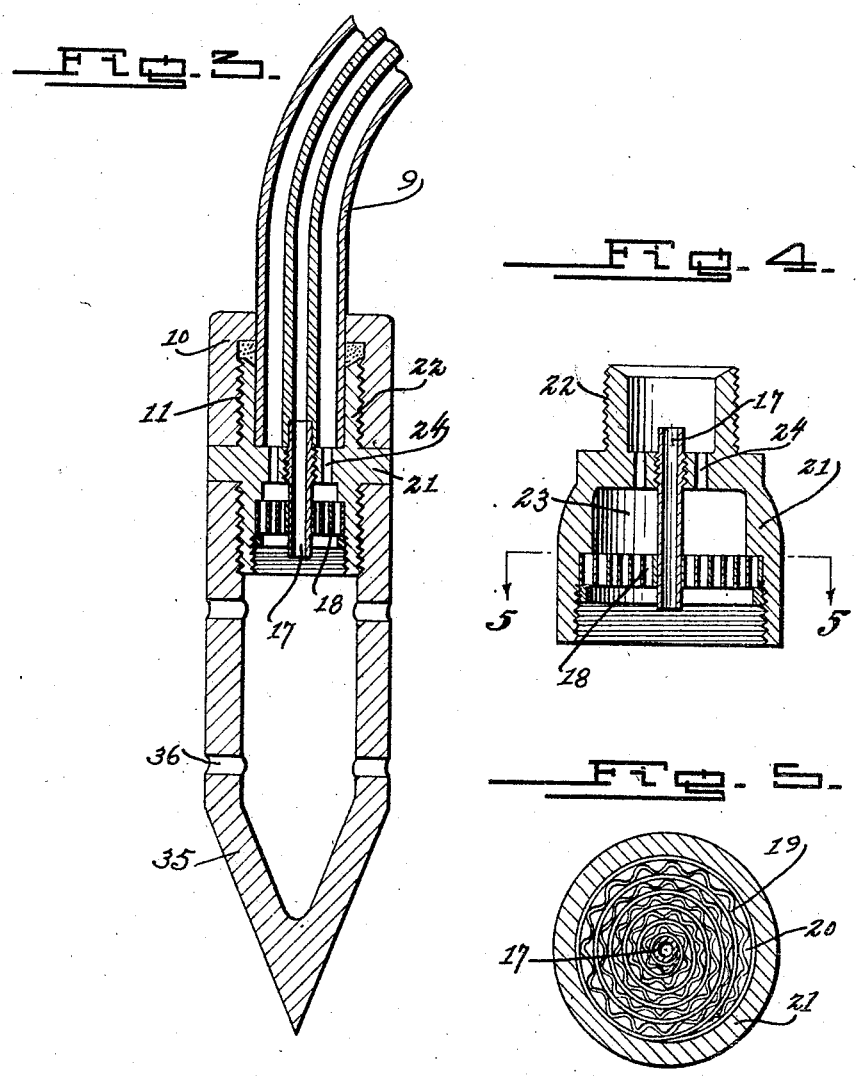

1,549,224

UNITED STATES PATENT OFFICE.

OLTMANN G. SCHMIDT, OF WHEATLAND, NORTH DAKOTA.

COMBINATION TORCH AND SOLDERING IRON.

Application filed March 20, 1923. Serial No. 626,339.

*To all whom it may concern:*

Be it known that OLTMANN G. SCHMIDT, a citizen of the United States, residing at Wheatland, in the county of Cass and State of North Dakota, has invented certain new and useful Improvements in Combination Torches and Soldering Irons, of which the following is a specification.

This invention relates to a burner and has for its principal object to provide a device which is especially adapted for use as a soldering iron or as a torch.

Another important object is to provide a burner of the above mentioned character, which is adapted to provide a means for supplying an efficient combustion of fuel with a supply of air under pressure.

A still further object of the invention is to provide a burner of the above mentioned character, which is of such a construction as to enable the various parts to be interchanged for the purpose of using the burner in connection with a torch or a soldering iron and the simplicity of the arrangement of the several parts renders the interchangeability thereof very quick and easy.

A still further object of the invention is to provide a burner of the above mentioned character, which is simple in construction, inexpensive, strong, durable and further well adapted for the purpose for which it is designated.

Other objects and advantages of this invention will become apparent during the course of the following description.

In the accompanying drawing forming a part of this specification and in which like numerals designate like parts throughout the same:—

Figure 1 is a partial longitudinal section of the burner embodying my invention.

Figure 2 is a sectional view taken on line 2—2 of Fig. 1.

Figure 3 is an enlarged detail section of the soldering tool.

Figure 4 is an enlarged detail section of the torch member.

Figure 5 is a sectional view taken on lines 5—5 of Fig. 4 looking in the direction of the arrows.

In the drawings wherein for the purpose of illustration is shown the preferred embodiment of my invention, the numeral 1 designates a casing formed of suitable material such as rubber and is constructed in two parts and held together by means of the bolts 2. The casing 1 is adapted to receive and support therein the conduit 3 and this conduit 3 terminates into an upwardly extending portion 4 adjacent the forward end of the casing 1 and terminates into an outwardly extending sleeve 5. The opposite end of the conduit 3 extends beyond the rear end of the casing 1 as more clearly shown at 6 in Fig. 1 of the drawings. The conduit 3 is furthermore provided with a branch conduit 7 which extends from the conduit 3 adjacent the rear end thereof within the casing 1 and is provided with an externally threaded end 8 the purpose of which will be hereinafter more fully described. Extending from the sleeve 5 of the conduit 3 and within the casing 1 is the outer pipe 9. The outer free end of the pipe 9 is provided with a collar 10 which is internally threaded at 11 in the drawings.

The upwardly extending portion 4 of the conduit 3 which terminates into the sleeve 5 has an inwardly extending portion 12 provided with external threads 13 at the outer end thereof for the purpose of receiving the coupling 14. A similar coupling 15 is threaded upon the outer threaded end 8 of the branch conduit 7. This construction affords means whereby the inner pipe 16 extends from the outer end of the branch pipe 8 through the extension 12, the sleeve 5 and longitudinally through the outer pipe 9 and terminating flush with the outer end of the outer pipe 9. The purpose of this inner pipe 16 is to provide a means for conveying the gas to the burner as will hereinafter be more fully described Adapted to be secured to the outer end of the pipe 16 is the short section of pipe 17 and this pipe 17 may be secured to the pipe 16 by providing the same with a threaded connection. The pipe 17 is adapted to carry at its outer end the burner 18 and this burner 18 is formed of two strips of brass or tin, one of the strips being crimped as shown at 19 in the detail sectional view of the burner and the other strip being smooth and then by rolling the two together a series of small apertures 20 are provided whereby the gas passes through the burner.

Secured to the outer pipe 9 by means of the threaded collar 10 is the burner head 21 and the upper end thereof is threaded as shown at 22 for the purpose of permitting the same to be held in the threaded collar 10. The lower portion of the burner head 21 is adapted to house the burner 18 and provides the combustion chamber 23. The burner head 21 is furthermore provided with an apertured plate 24. The apertured plate 24 is disposed above the burner carried by the pipe 17 and which is threaded upon the pipe 17 adjacent the outer end of the inner pipe 16 as more clearly shown in the drawings.

A suitable air pressure tank 25 is connected to the gasoline tank 26 by means of the pipes 27 and 28, the pipe 28 extending into the gasoline tank. The gasoline tank is furthermore provided with an outlet pipe 29 in the upper end thereof which communicates with the pipe 30 and this pipe 30 is connected to the conduit 3 at the rear of the casing 1. The pipe 27 is furthermore provided with a Y connection at its outer end and the purpose of this arrangement is to provide a means whereby the pipe 28 may be connected to the pipe 27 and a pipe 31 may be connected to the other section of the Y connection so as to communicate the pipe 27 with the pipe 30. Suitable valves 32, 33, 34 and 35 are provided in the pipes 27, 28, 31 and 29 respectively for the purpose of regulating the amount of air and gas which is admitted through the pipe 30 into the conduit 3.

It is to be understood that the air in the tank 25 is under pressure and that when the valve 27 is open and also the valve 33 and pipe 28 is allowed to remain open, the air will pass through the pipe 27 and pipe 28 into the gasoline tank 26 where the same comes in contact with the gasoline within the tank 26 and causes the evaporation of the gas therein, the vapor resulting will pass through the pipe 29 and into the pipe 30 where the same is carried to the conduit 3 and out through the pipes 16 and 9 for the purposes hereinafter to be more fully described.

If however it is only desired to supply a certain amount of air and gas to the pipes 16 and 9, the valves 33 and 34 may be regulated to accomplish this result. After the gasoline has been passed through the pipe 30 and it is desired to add more air to the gas, the valve 34 is open and the air from the tank 25 will pass through the pipe 27 and through the pipe 31 and into the pipe 30 where the same will mix with the gas coming from the gas tank 26 and thereby give the proper mixture to provide for the proper burning of the gas with the burner head 21 and more specifically in the burner 18.

When it is desired to use the tool as a soldering iron, the soldering iron 35 may be secured to the burner head 21 by any suitable threaded connection and the burner 18 will then be in position within the upper end of the soldering iron as more clearly shown in Fig. 3 of the drawings. Suitable exhaust gas flame apertures 36 are provided in the soldering iron 35 as is well known in the art.

If however, it is desired to use the tool, the burner as a torch, the soldering iron 35 is removed from the burner head 21 and the same is then ready for use as a torch.

A suitable needle valve 37 is supported by the casing 1 and is adapted to communicate with the conduit 3 for the purposes of regulating the amount of gas and air being fed to the burner 18.

It will be seen from the foregoing description that a burner has been provided wherein gas and air under pressure are caused to heat a soldering iron in one instance and furthermore produce the proper flame to be used and to enable the burner to be handled more easily and quickly as a torch.

The burner 18 is of such a construction and is associated with the pipe 17 carried by the inner pipe 16 at the outer end thereof to produce the proper kind of a flame and in the present instance a long thin flame will be provided wherein the proper use of the heater is obtained and the tool will be heated more easily and quickly and adapted for use immediately.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion and in the minor details of construction may be resorted to, without departing from the spirit or sacrificing any of the principles of the invention.

What I claim as new and desire to secure by Letters Patent is:—

1. A tool of the class described comprising a casing, a conduit therein, a branch conduit extending therefrom and disposed within said casing, an outer tube extending from one end of said casing and secured to an extension of said conduit, the opposite end detachably supporting a burner head, an inner tube connected at one end to the free end of said branch conduit, said inner tube extending longitudinally through said outer tube and terminating in said burner head, a burner carried by the outer end of said inner tube, means for supplying gas and air to said tube, means associated with said conduit for regulating the supply of air and gas passing therethrough, and a tool detachably secured to the outer end of said burner head and adapted to enclose said burner.

2. A tool of the class described comprising a casing, a conduit therein, a branch conduit extending from said main conduit within said casing, an outer tube secured to said main conduit, said outer tube supporting a burner head at its outer end, an inner tube extending through said casing and said outer tube connected at one end to said branch conduit, the other end extending into said burner head and supporting thereon a burner, means for supplying air and gas to said conduit, means for controlling said supply of gas and air in said conduit, a hollow tool detachably mounted upon the outer end of said burner head and adapted to enclose said burner, said hollow tool provided with apertures to permit the escape of the exhaust gas flames.

3. In a device of the class described, a casing, a conduit extending longitudinally therethrough and having an angular extension at its one end also projecting through one end of said casing, a second arcuate extension formed on said conduit adjacent its opposite end and disposed within said casing, an outer tube member having its one end engaged with the end of the angular extension of said conduit, an inner tube member extending through said outer tube and through the casing, being connected at its inner end with the arcuate extension of the aforesaid conduit within said casing, a burner head connected with the outer end of said outer tube, a burner within said head connected with the outer end of said inner tube, and means for supplying air and gas to said conduit, as and for the purposes described.

In testimony whereof I affix my signature.

OLTMANN G. SCHMIDT.